United States Patent
Kramer et al.

[11] Patent Number: 5,928,546
[45] Date of Patent: *Jul. 27, 1999

[54] ELECTRICAL RESISTANCE COOKER AND AUTOMATIC CIRCUIT CONTROLLER

[75] Inventors: David M. Kramer, Palos Verdes, Calif.; Maurice W. Lee, Jr., P.O. Box 25, Boley, Okla. 74829; Ivanhoe E. Chaput, Torrance, Calif.; Maurice W. Lee, III, Boley, Okla.

[73] Assignee: Maurice W. Lee, Jr., Boley, Okla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/920,655

[22] Filed: Aug. 29, 1997

[51] Int. Cl.$^6$ .................................................... H05B 1/02
[52] U.S. Cl. .......................... 219/497; 219/501; 219/518; 99/358; 99/342
[58] Field of Search .................................... 219/497, 494, 219/501, 5 A, 518; 99/358, 332, 349, 451, 342; 340/664

[56] References Cited

U.S. PATENT DOCUMENTS

| | | |
|---|---|---|
| 3,543,673 | 12/1970 | McDevitt ................................. 99/358 |
| 3,632,962 | 1/1972 | Cherniak ................................. 219/200 |
| 3,651,753 | 3/1972 | Schmidt ..................................... 99/358 |
| 3,842,724 | 10/1974 | Korr et al. ................................ 99/358 |
| 3,948,159 | 4/1976 | Vigerstrom ............................... 99/358 |
| 4,029,937 | 6/1977 | Russell ..................................... 215/295 |
| 4,046,991 | 9/1977 | Sefton et al. ............................. 219/497 |
| 4,225,776 | 9/1980 | Meisner et al. .......................... 219/492 |
| 4,554,440 | 11/1985 | Lee, Jr. ..................................... 219/501 |
| 4,822,982 | 4/1989 | Lee, Jr. ..................................... 219/497 |
| 4,996,912 | 3/1991 | Theimer et al. .......................... 99/358 |

*Primary Examiner*—Mark Paschall
*Attorney, Agent, or Firm*—Robert K. Rhea

[57] ABSTRACT

An automatic circuit controller for cooking food interposed between electrodes connected with a source of AC by electrical resistance in which the resistance increases until the food is cooked and rapidly declines is formed by a current switching element in series in one wire of the AC source and a current sensing element in series in another wire of the AC source. The sensed current is rectified, reduced in voltage, converted from analog to digital and applied to a microprocessor connected with the switching element for controlling the current applied to the food by delaying the time into every half cycle in response to current measuring circuitry and a zero crossing detector for triggering the switching element on. The microprocessor detects the current peak of electrical resistance of the food and stops the cooking action when the current declines to a predetermined percent of the peak.

25 Claims, 12 Drawing Sheets

ELECTRICAL RESISTANCE COOKER AND AUTOMATIC CIRCUIT CONTROLLER

CROSS REFERENCE TO RELATED APPLICATIONS

Not applicable.

STATEMENT REGARDING FEDERALLY SPONSORED RESEARCH OR DEVELOPMENT

Not applicable.

1. Background of the Invention

The present invention relates to electrical resistance cooking and more particularly to a controller and method of applying current to the food by detecting the peak of electrical resistance of the food and stopping the cooking action at an optimum food condition.

2. Brief Summary of the Invention

This device simultaneously cooks two hamburger patties by passing an electrical current through the meat. There is no heating element. The electrical resistance of the meat limits the current and heats the burgers according to Ohm's law V=IR. The power dissipated in the meat is equal to the square of the voltage divided by the resistance.

Initially, the uncooked hamburger patties have a fairly high resistance. As the meat cooks, the resistance decreases causing the current to increase. When the meat is cooked, the current reaches a maximum value and begins to decline. This change in current is sensed by the controller circuit which automatically interrupts the current when it drops to a predetermined value.

Chicken may also be cooked by this apparatus. However, since the cooking time of chicken is greater than hamburger meat, the current shutoff point is set to about 37% of the current peak. This leaves the cooker "on" longer and assures that the chicken is fully cooked.

The controller circuit includes a triac triggered on by a microprocessor to apply electrical potential to the cooking device to start and stop the food cooking process as a function of the cooked condition of the food at optimum points for ground beef, chicken or other food products.

The optimum points are determined by measuring the values determined by an analog-digital converter. These values are proportional to the average value of the half cycles of input current. The input current is the current which flows through the foods being cooked. For the cooking process of the meat, the resistance starts at a very high point, gradually decreasing to a low point, and then becomes high again. The input current is inversely affected. It starts at a low value and gradually increases to a peak and then declines. Thus, the value of the output of the analog-digital converter will become greater each half cycle up to a peak and then become smaller. The unit will continue to cook as long as these values increase. Once they reach the peak and decline to a value of approximately 87% for hamburgers and 37% for chicken of the peak, the unit cuts off.

Since the resistance of the meat being cooked is the only controlling factor to the input current, currents of 30 to 60 amperes or more may be reached depending on the line voltage. Thus, it renders the appliance useless as a household appliance where the fuse or breaker protected circuits may be as low as 15 amps at 115 volts AC. Higher voltages than 115 VAC, such as 220 VAC, will aggravate the condition and will proportionally increase the current. The controller circuit has a further function of controlling the input current by delaying the triggering point of the triac after the input current reaches a preset maximum point. This preset maximum point will control or limit the current to that desired, such as 15 amperes at 115 volts AC, for a commonly protected household circuit and at approximately 7 amperes at 220 volts AC.

The principal objects of the invention are: to provide a circuit for cooking food by direct energy transfer from a continuous alternating current selectively triggered on after every half cycle; and, automatically monitor the current and discontinue food cooking current at an optimum point for ground beef, chicken or other food products, as a function of the resistance of the food to the current for preventing undercooking or overcooking the food and preventing formation of carcinogen compounds.

DESCRIPTION OF THE PREFERRED EMBODIMENTS

Like characters of reference designate like parts in those figures of the drawings in which they occur.

In the drawings:

The reference numeral 10 indicates the apparatus as a whole which is rectangular in overall configuration comprising a cooking unit 12 removably supporting an electronic cooking controller base unit means 14 housing a circuit 15 as presently described. The cooking unit 12, formed from non-conductive material, comprises an upwardly open box-like base member 16 and inverted box-like lid member 18 separably connected with the base member 16 by hinge means 20 at rearward longitudinally extending side walls. An electrical insulating partition 22 extends transversely across the top of the longitudinal forward and rearward sidewalls of the base member 16 medially its ends and defines a moisture and grease collecting recess or well 24, only one side being shown, across the bottom of the base member. A plurality of upstanding webs 26, normal to the plane of the base member bottom 28, project inwardly from the respective end and side walls of the base member for supporting a pair of electrode plates 30 and 32, preferably formed from stainless steel, in parallel spaced relation with respect to the base member bottom wall 28. Each of the electrodes 30 and 32 are provided with an integral upstanding electrical terminal 31 and 33 respectively disposed in parallel spaced apart relation for the purposes presently explained.

Figures 1, 2:
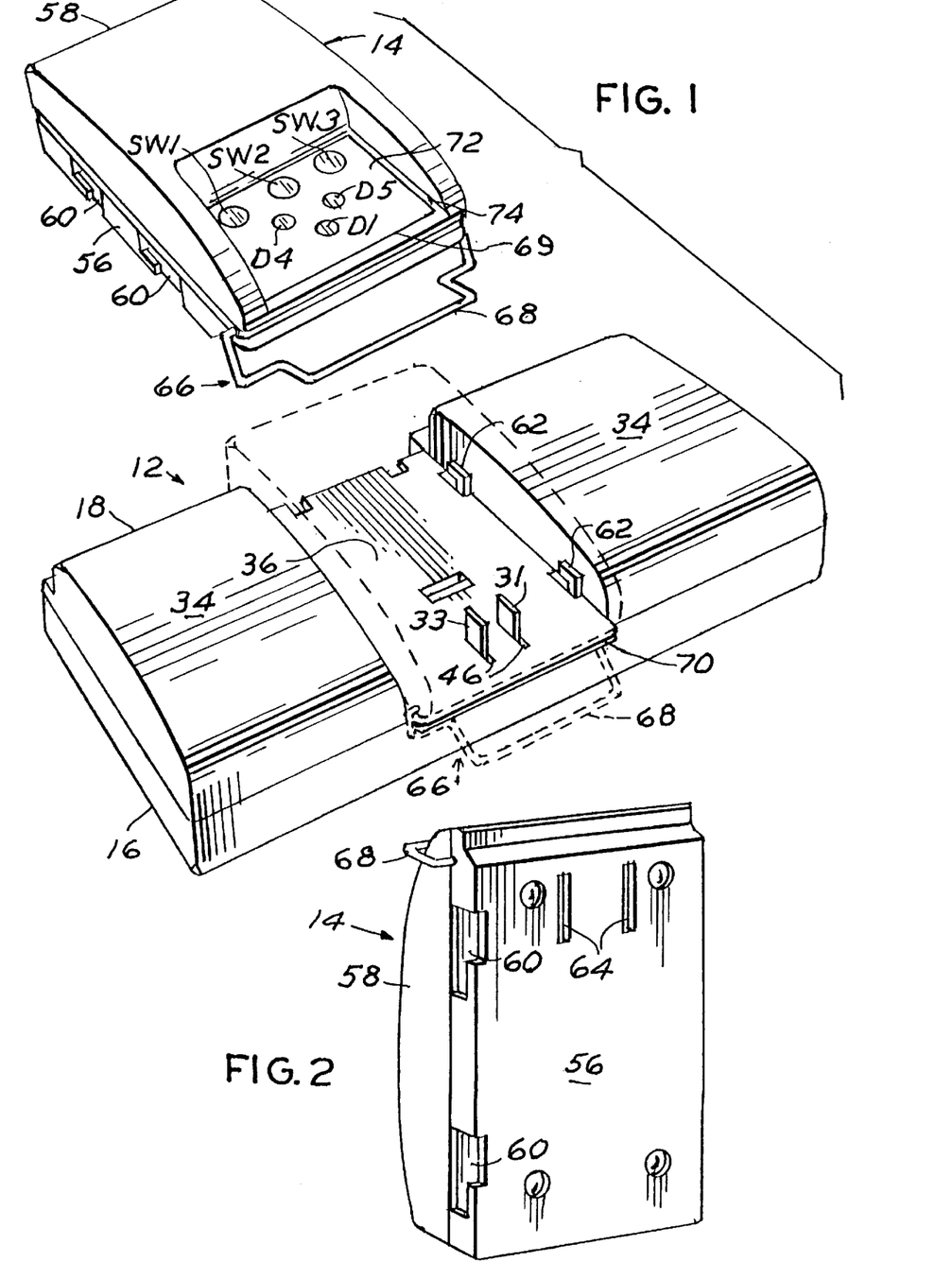
FIG. 1 is an exploded perspective view of the device.
FIG. 2 is a bottom view of the controller housing.
Figure 3:
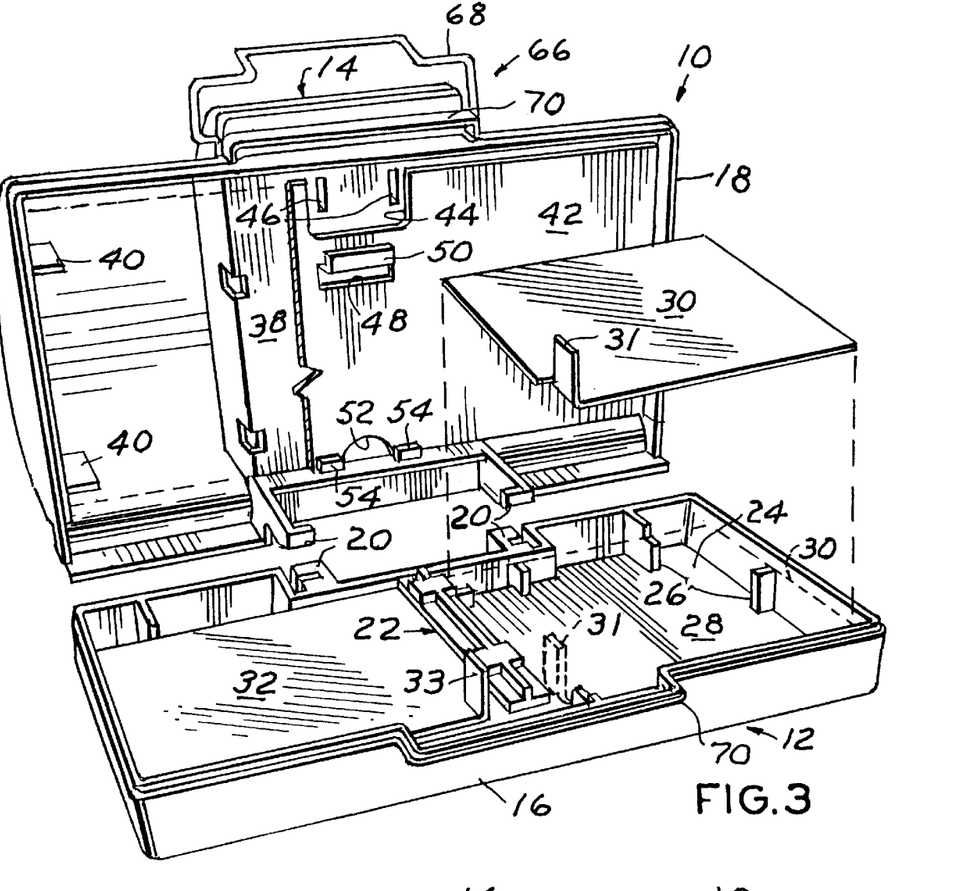
FIG. 3 is an exploded perspective view of the cooker in open position with parts broken away for clarity.
Figure 4:
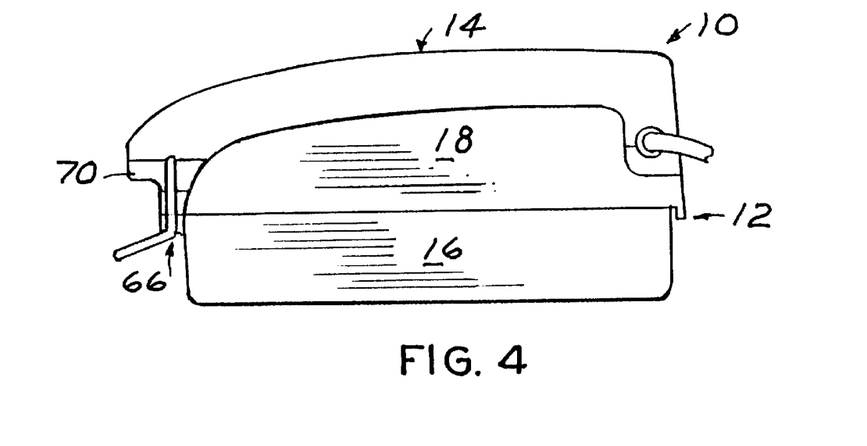
FIG. 4 is a right end elevational view of FIG. 1 in assembled position.

As best illustrated by FIG. 1 the top wall 34 of the lid member 18 is transversely offset downwardly, medially its ends to form an open end recess 36 for nesting the controller unit 14 and forming a planar wall surface 38 facing the electrode plates 30 and 32 for supporting, in combination with other web members 40 similarly secured to the inner wall surfaces of the lid member 18, a third stainless steel electrode plate 42 substantially coextensive with the inner wall surfaces of the lid member 18 and bridging the spacing between the food receiving electrodes 30 and 32 when the lid member 18 is closed on the base member 12. A laterally open recess 44 in the longitudinal upper edge portion of the third electrode plate 42, as viewed in FIG. 3, loosely surrounds a pair of parallel slots 46 cooperatively receiving the electrode terminals 31 and 33 when the lid member is closed. An aperture 48 formed in the third electrode plate 42 surrounds an electrode supporting tab 50 disposed in cooperating spaced relation with respect to the adjacent plane of the recess wall 38 for removably maintaining the third electrode plate 42 in contact with the recess wall surface 38. A second laterally open arcuate recess 52 bridges the spacing between the third electrode plate 42 side edge opposite the terminals 31 and 33. A pair of tabs 54, similar to the tab 50, on the recess wall 38 bottom edge portion, as viewed in FIG. 3, at opposite limits of the recess 52 maintain the third electrode 42 in contact with the recess wall surface 38 and in parallel spaced relation with the base electrodes 30 and 32 when the lid 18 is closed.

Figure 5A:
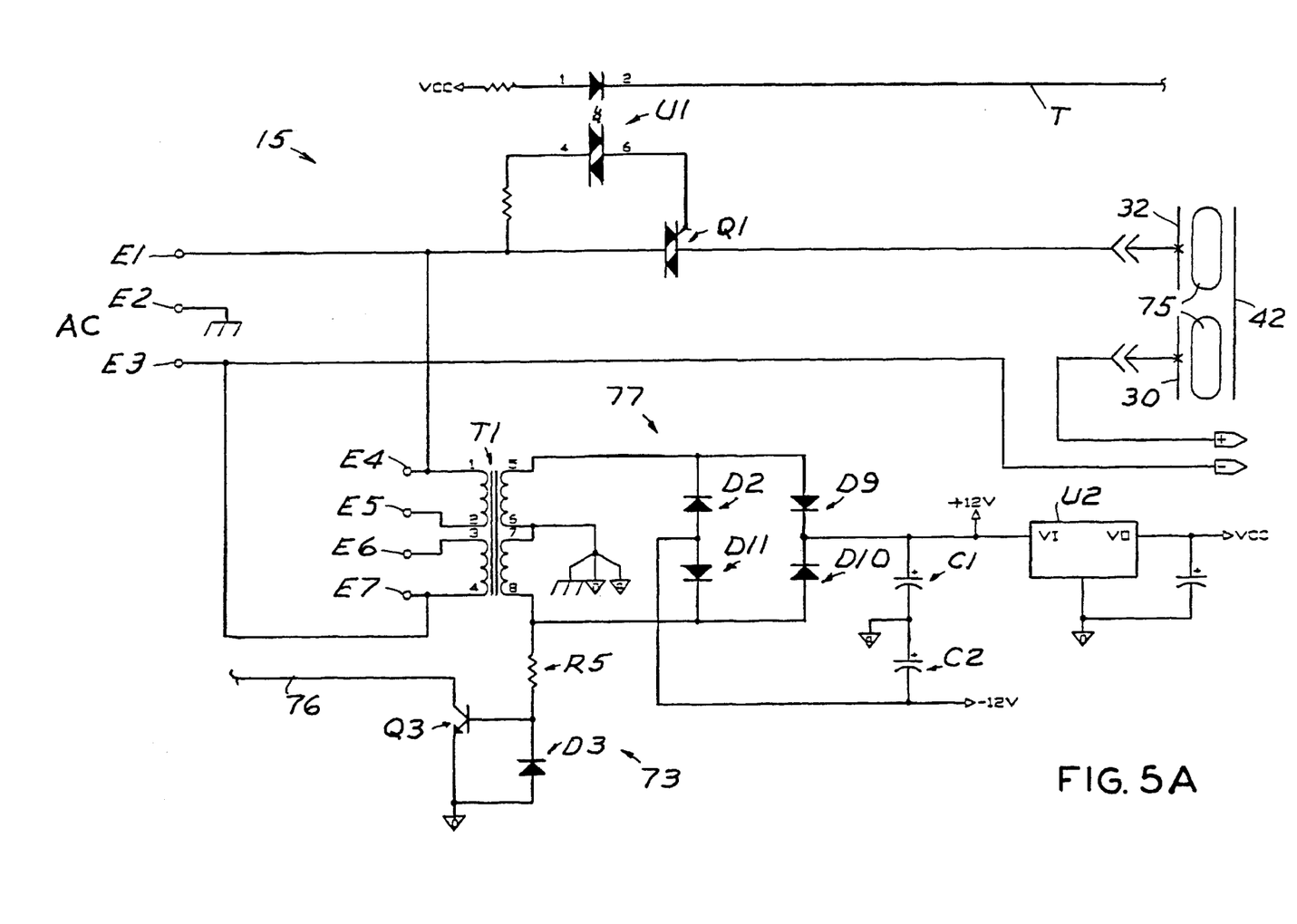
FIGS. 5A and 5B collectively constitute a schematic circuit diagram when arranged horizontally with FIG. 5A at the left; and, FIGS. 6A–6H are flow charts of a program implemented in the microprocessor of FIG. 5B.
Figure 5B:
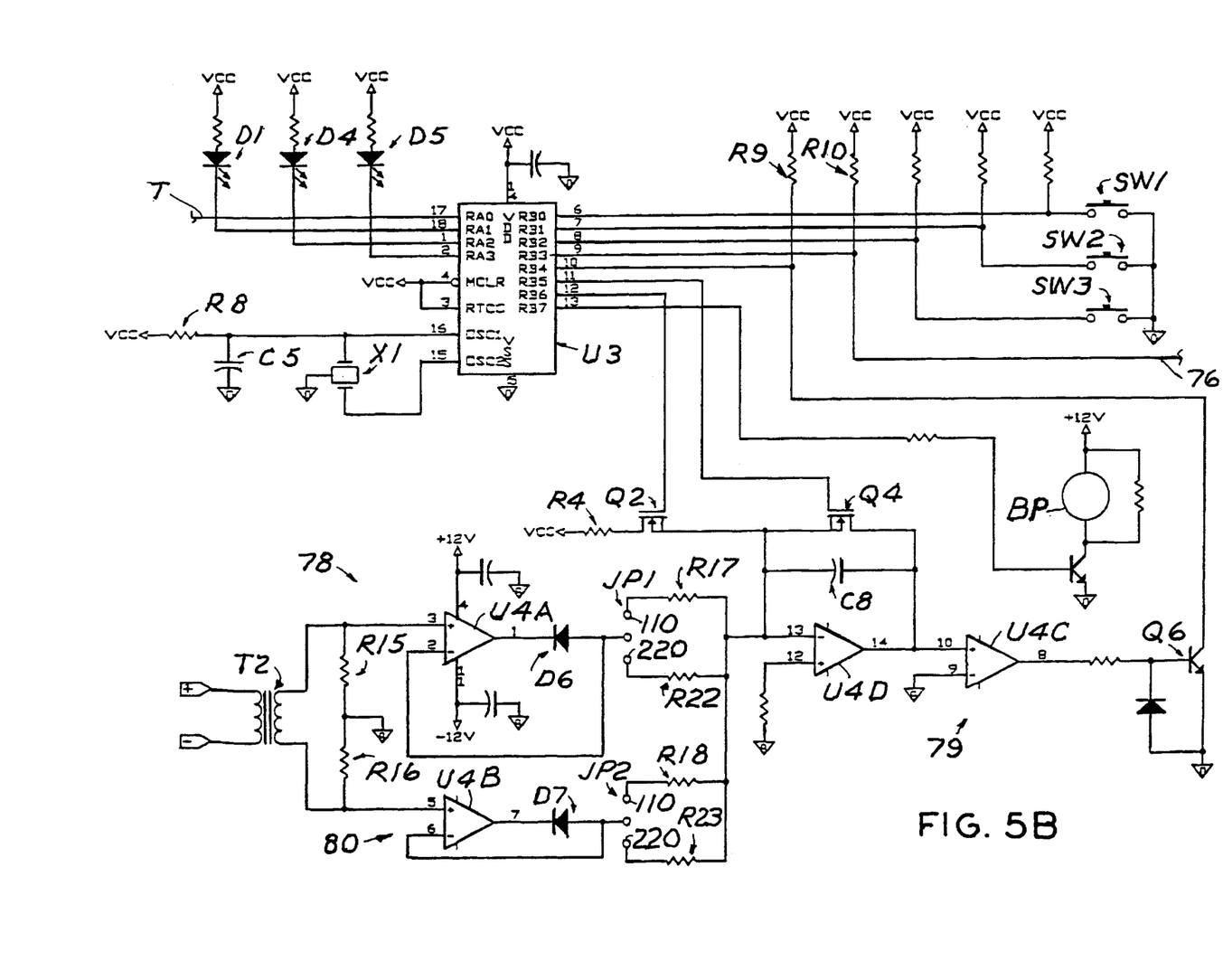
Figure 6A:
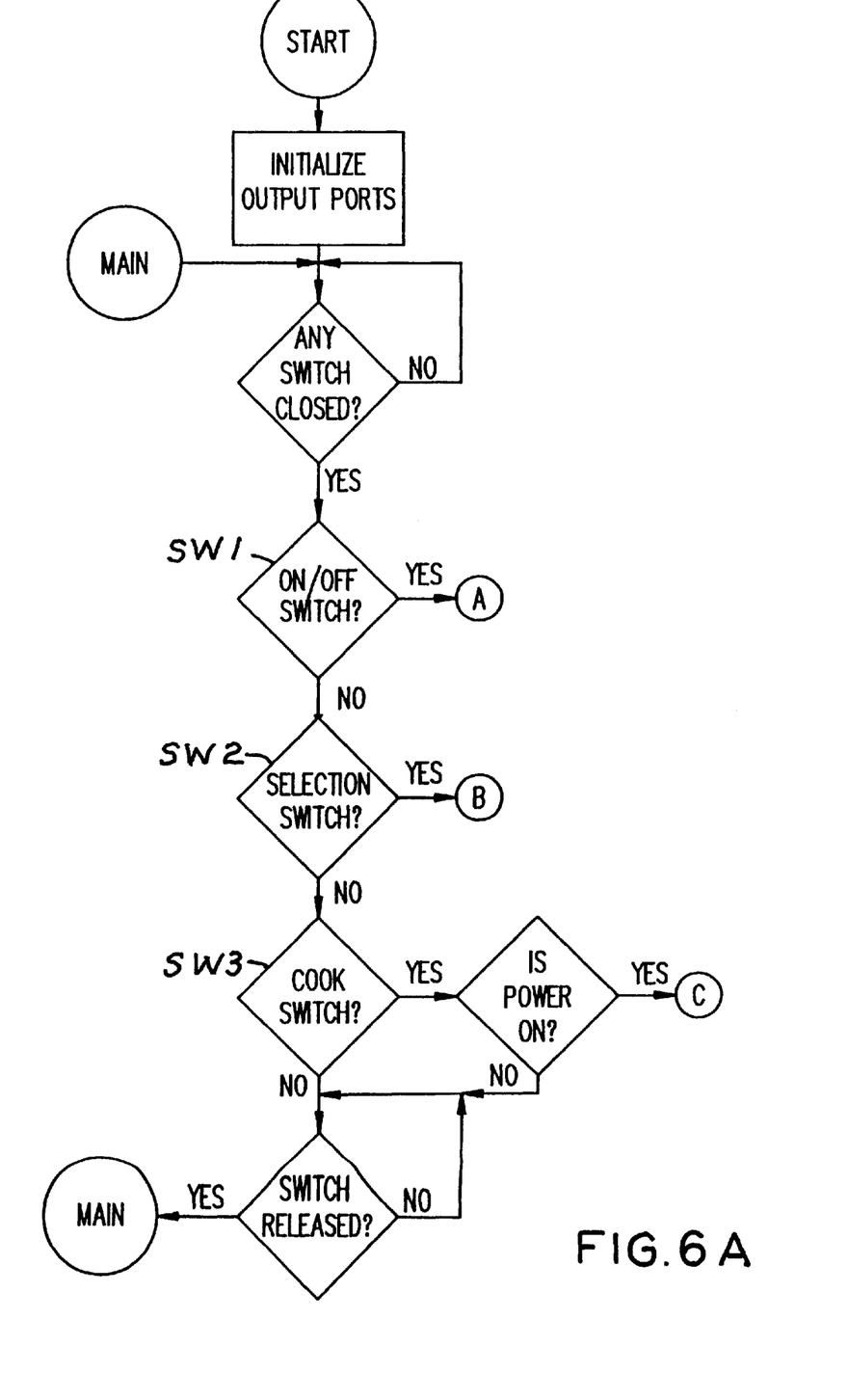
Figure 6B:
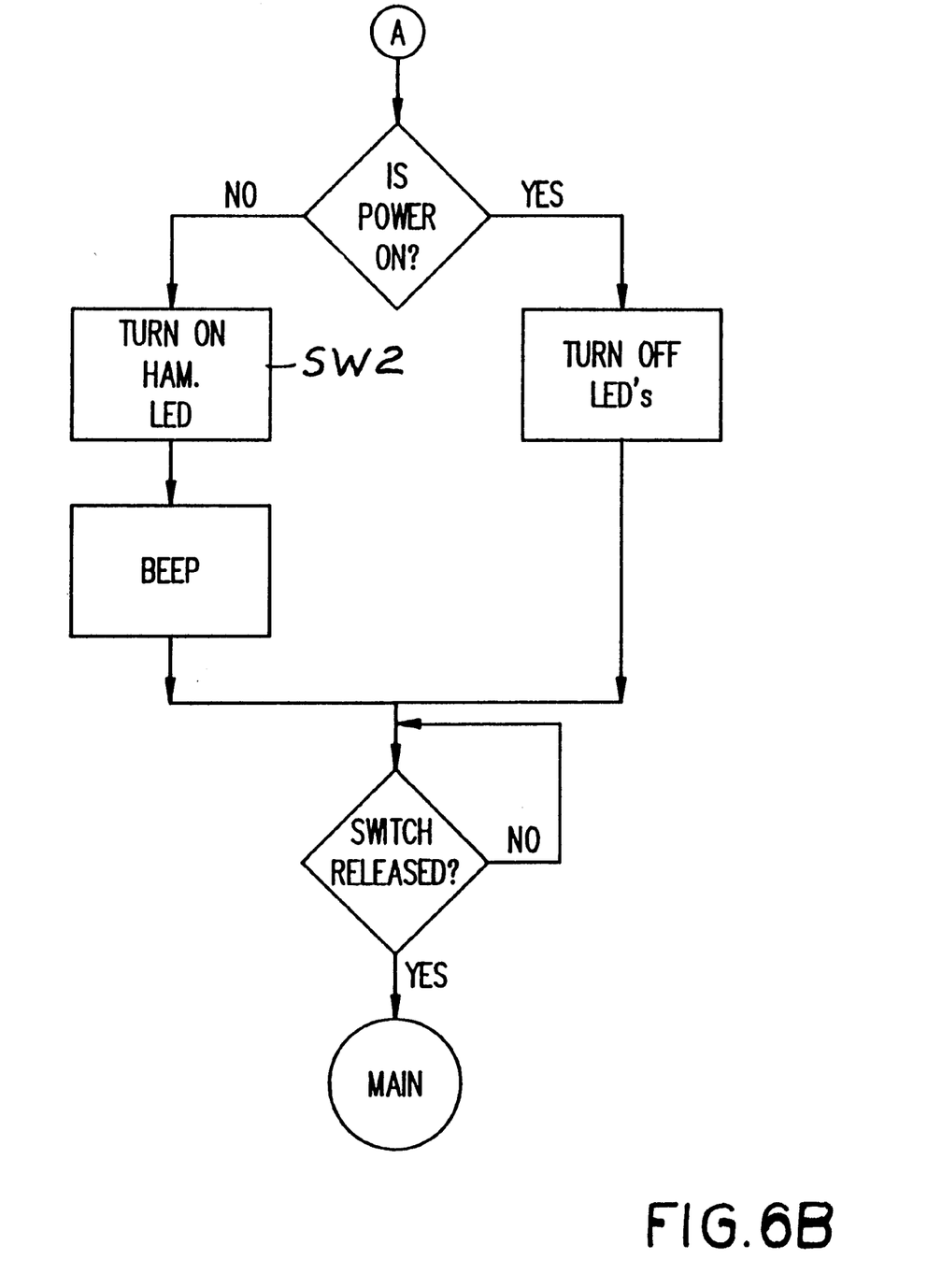
Figure 6C:
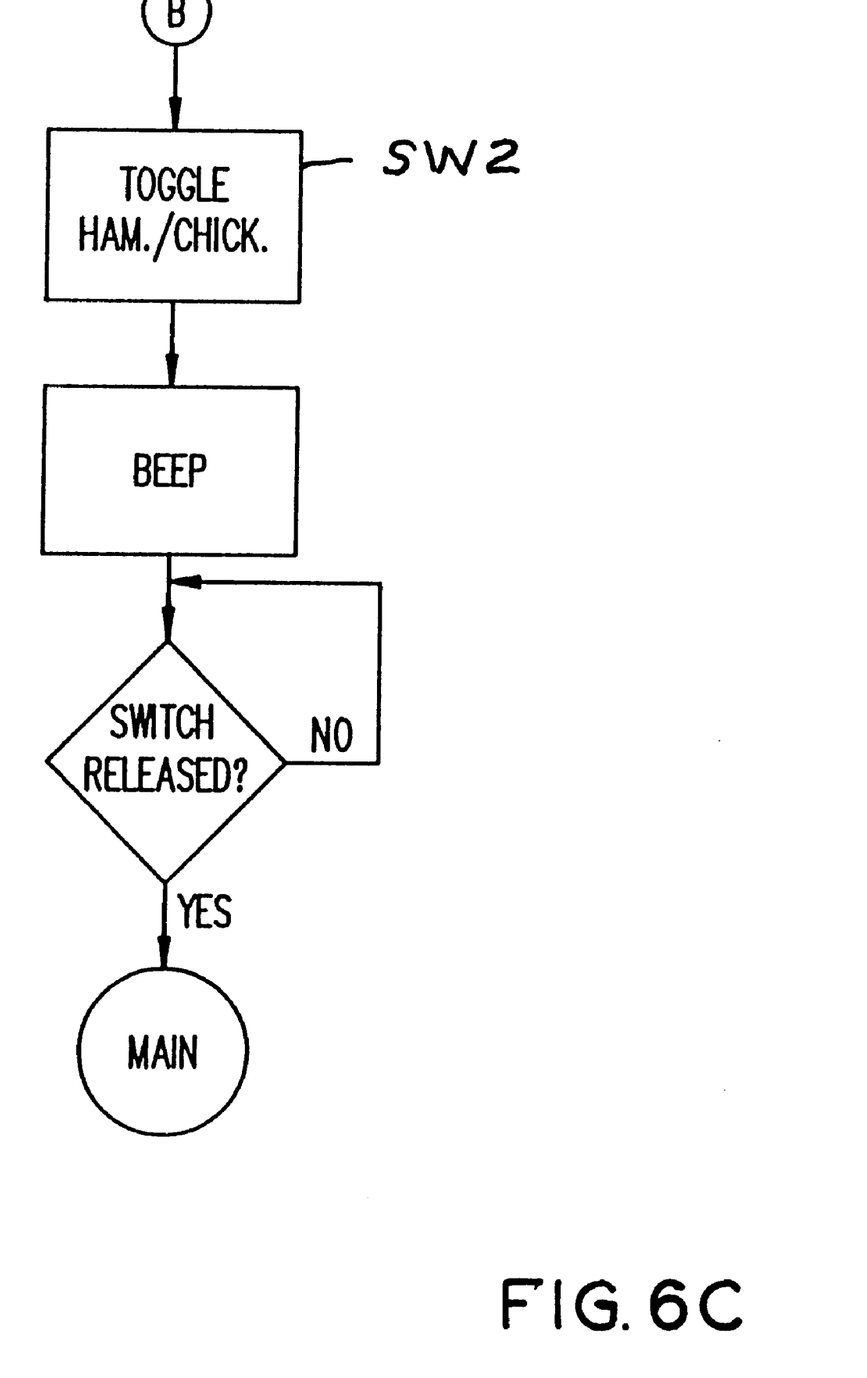
Figure 6D:
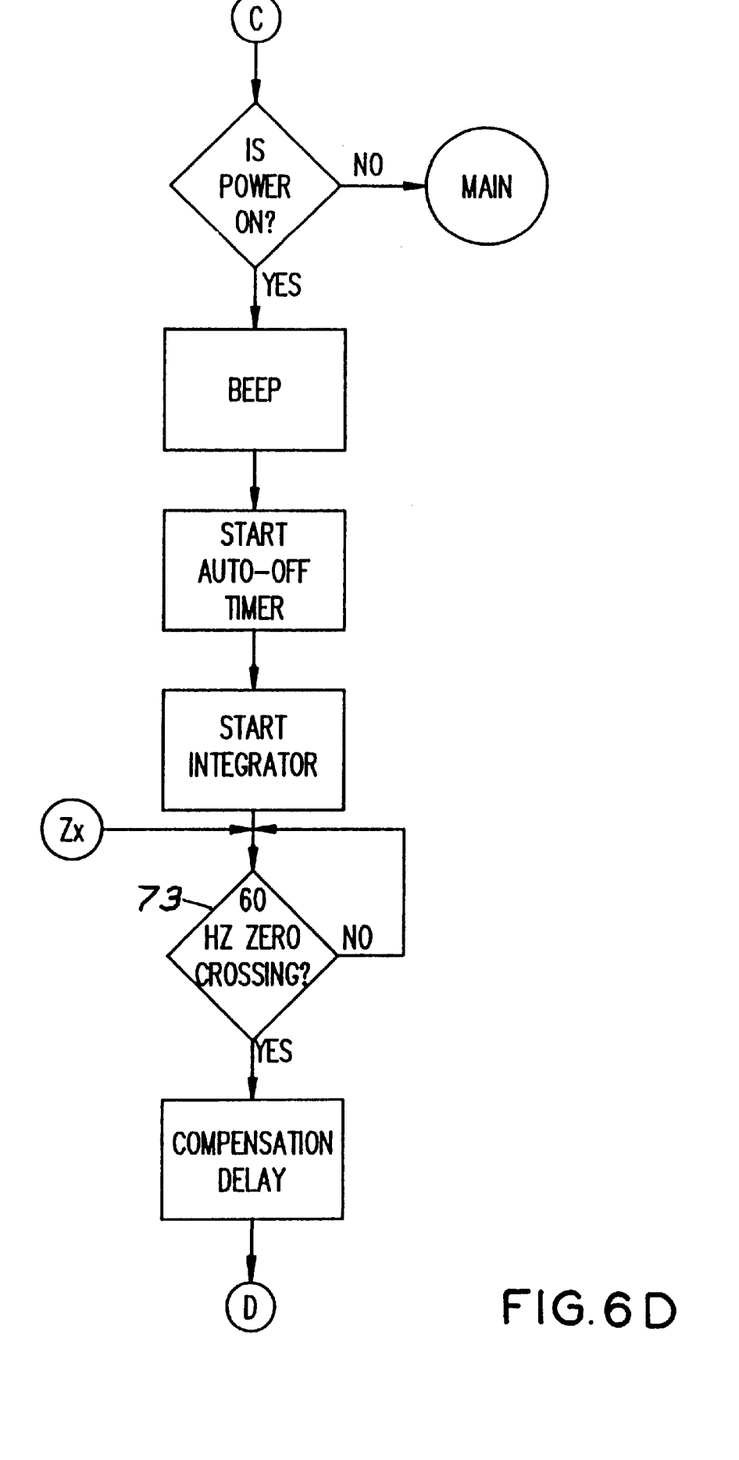
Figure 6E:
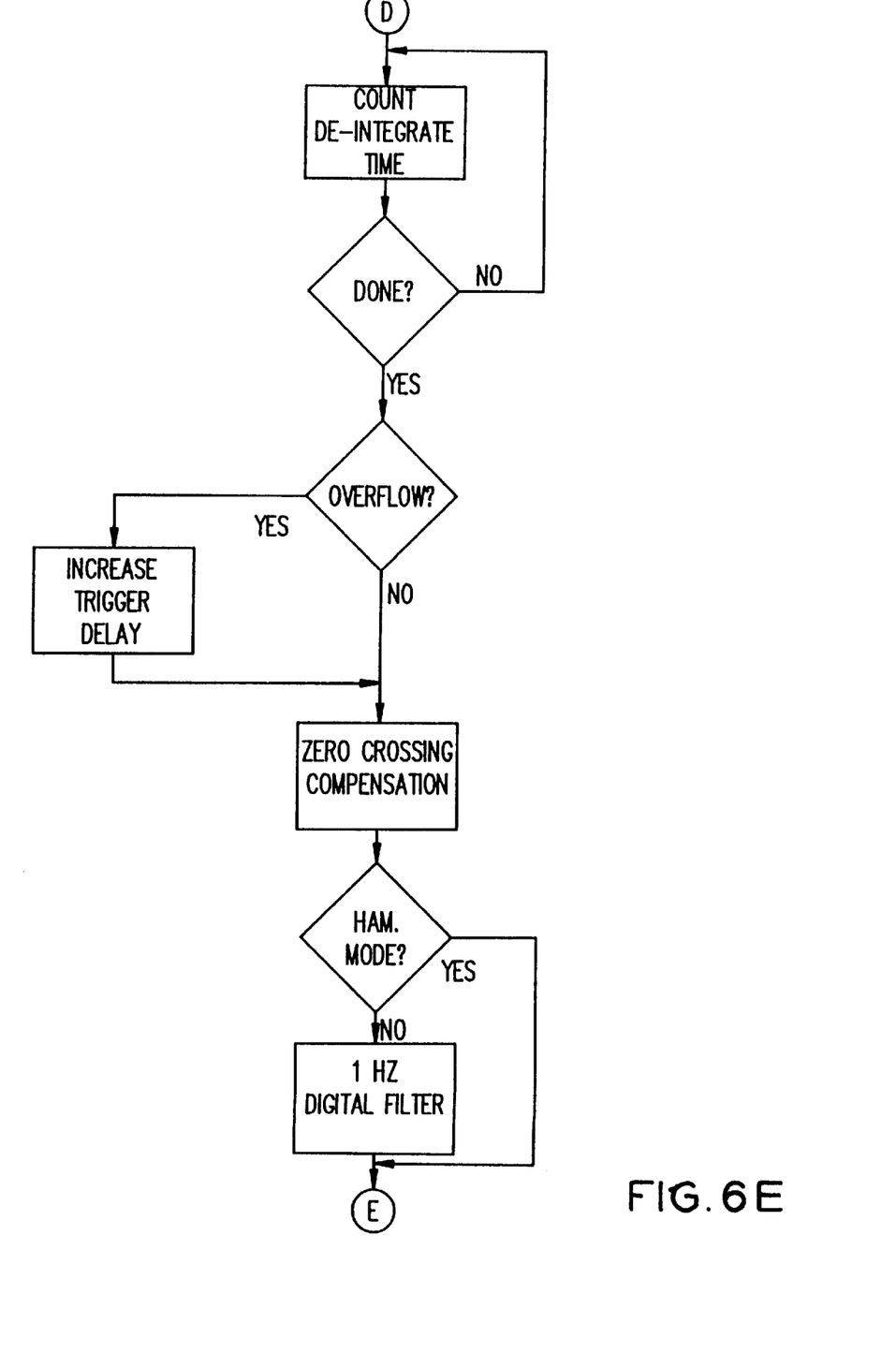
Figure 6F:
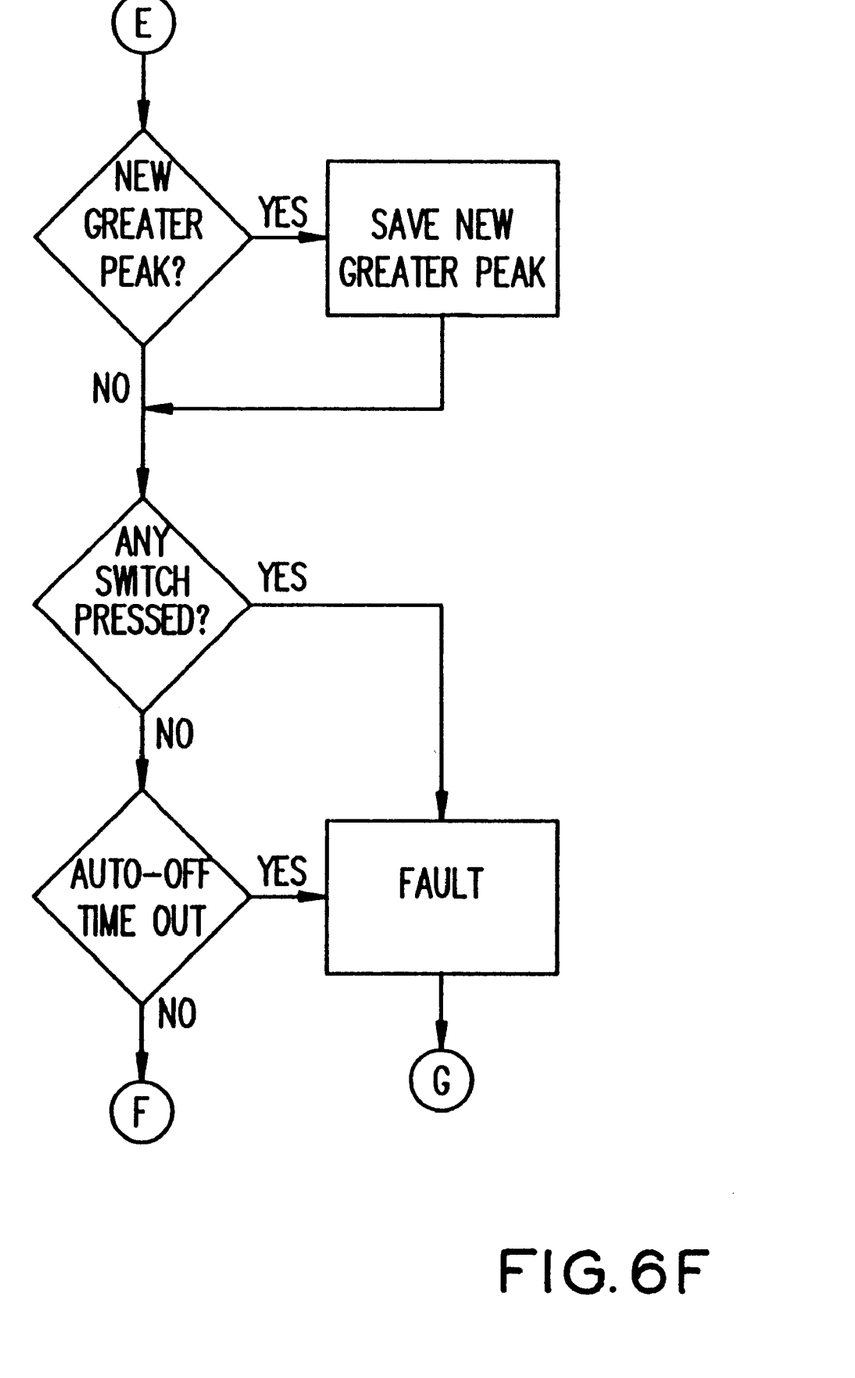
Figure 6G:
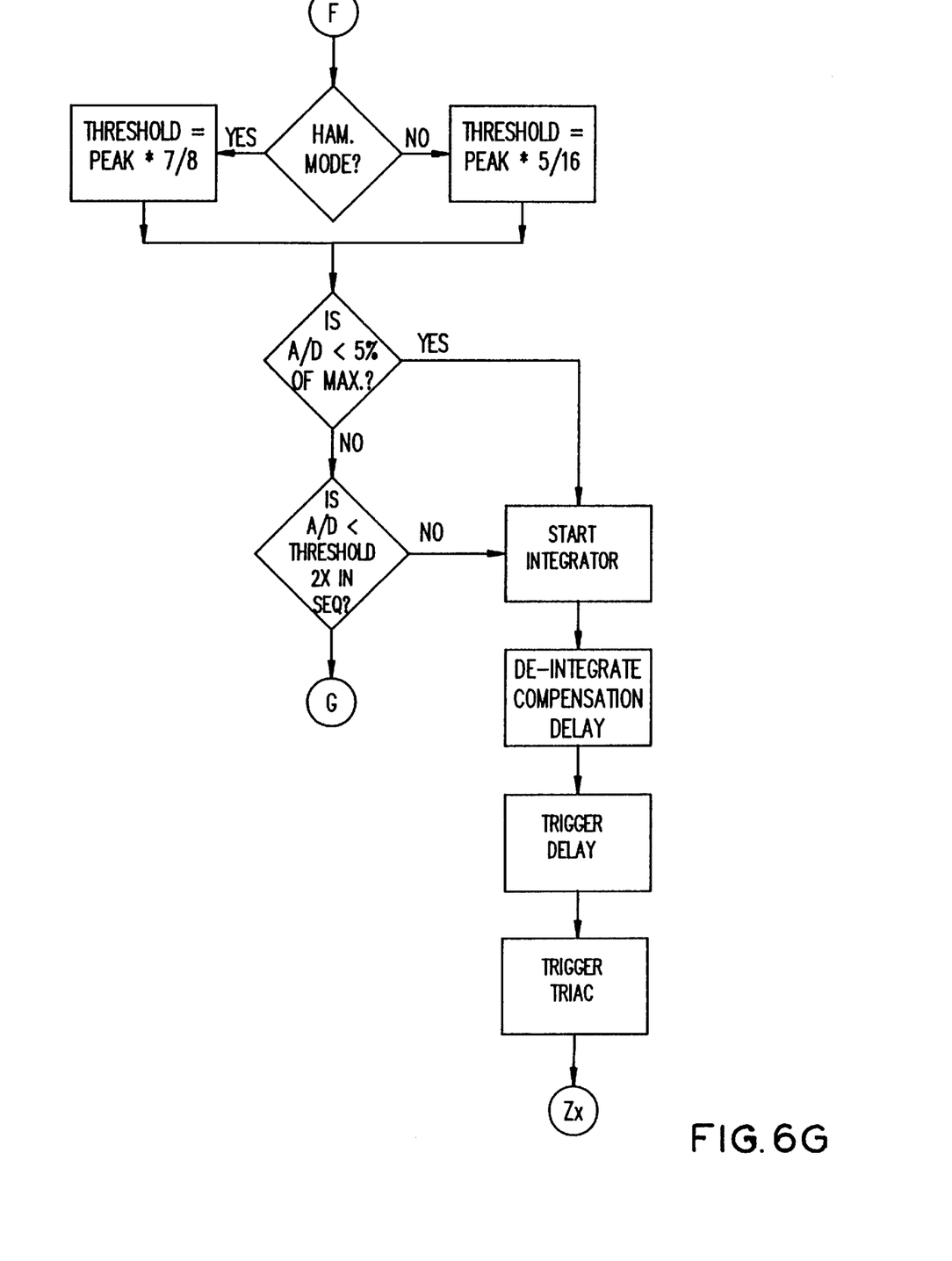
Figure 6H:
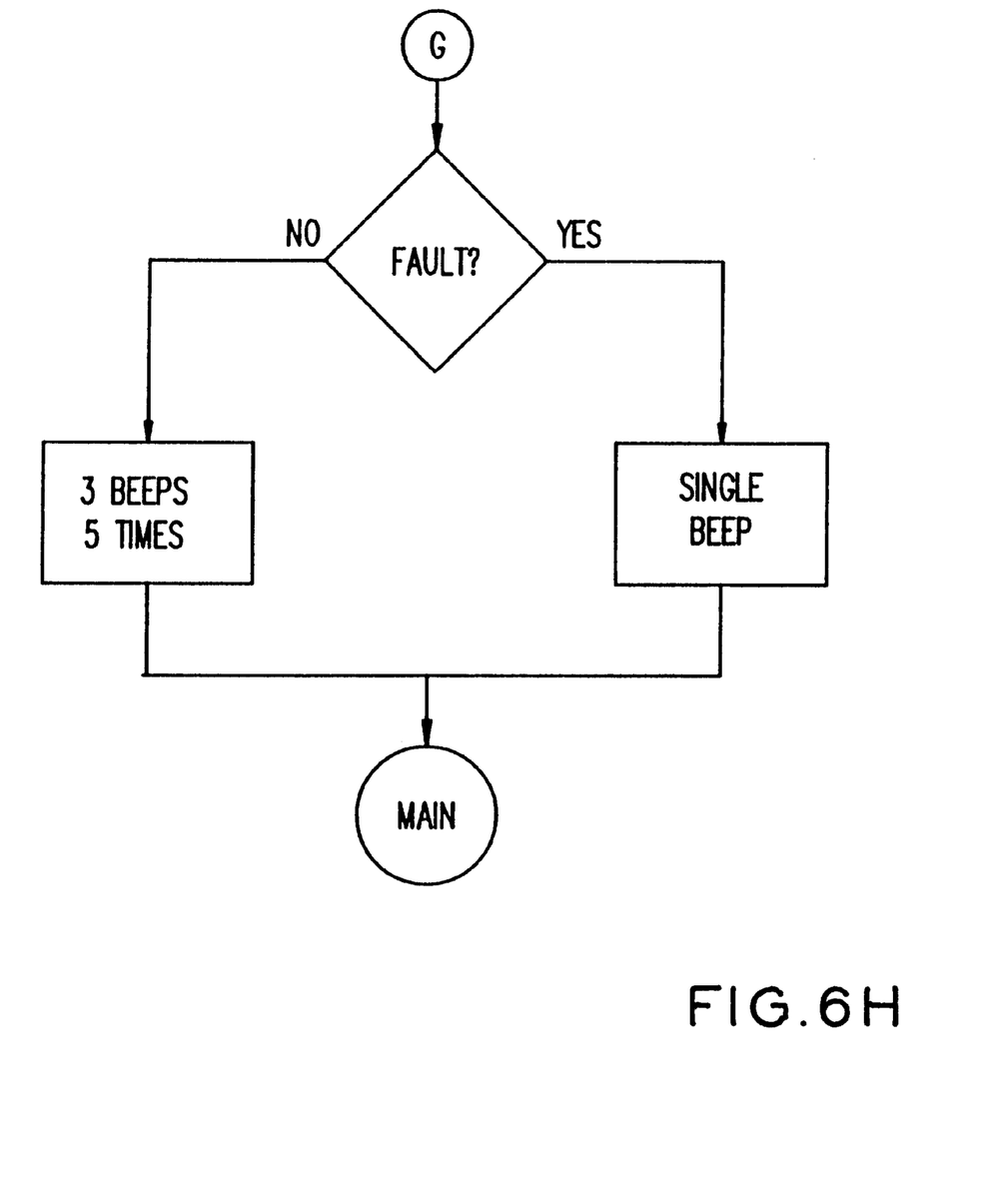

The controller unit 14 comprises a housing having a base 56, containing the presently described electronic components illustrated by FIGS. 5A and 5B, and a cover 58 and secured to the controller base 56 in a conventional manner. The base 56 is provided with a plurality of latch recesses 60 on its respective sides, only two being shown, which cooperatively receive protruding latches 62, only two being shown, on the walls forming the sides of the cooker lid recess 36. The latches 62 enter the respective latch recess 60 and by a forward sliding movement of the controller unit 14 locks the housing to the lid 18 when disposed within the recess 36. The housing base 56 is similarly provided with a pair of elongated slots 64 for cooperatively receiving the electrode terminals 31 and 33 projecting upwardly through the lid recesses 44 and 46.

A bail 68 functions as a latch to keep the top closed and to insure even contact with the meat during the cooking process. Chicken, for example will explode and tend to push the top up and cause interruptions in current and unevenness in cooking.

Between its respective forward sides the top wall of the controller cover 58 is depressed to form a forwardly open recess 72 having a bottom 74 spaced above and parallel with the plane of the base member 56 for receiving an operator's panel 69 indicating the location of three switches, power SW1, select mode SW2 and start SW3 and respectfully revealing the position of three LED's, hamburger D4, chicken D5 and cooking D1 respectfully energized by the circuit during the cooking process and viewed through apertures, not shown, formed in the recess bottom wall 74.

Circuit General Description

Referring to the circuit 15 of FIGS. 5A and 5B the AC line is connected to terminals E1 and E3 (and to terminal E2 if a grounded line cord is used). The neutral wire of the power source is connected to E3 and to the primary of the current sense transformer T2 to allow sensing of the cooking current. In come cases it may be passed a single time through the opening of a current sense transformer designed to sense the current in a single conductor. This makes a single turn primary for sensing the cooking current and serves the same purpose as current sense transformer T2. The current through the power supply transformer T1 is negligible and does not affect the cooking current measurement.

A triac Q1 (bidirectional triode thyristor) acts as a principal control element of the cooking process by switching "on" the current to the food. When triac Q1 is triggered, it does not shut off until the current drops to zero. Since the input power is AC, typically 60 Hz, the longest time until the current drops to zero will be 8.33 milliseconds "msec" (one half cycle). The triac Q1 is biased on and off by current on a conductor T applied to or removed from its gate element U1 by a control circuit 80 and microprocessor U3 as presently explained. The control circuit causes the cooking process to start and stop at the optimum points for hamburger, chicken, or other food products. The AC input is also connected to the primary of power supply transformer T1 which supplies power to the circuit 15. There is no "off-on" switch in the AC input line. When the cooker unit 14 is plugged in, it is always on since the circuit 15 is powered. However, the unit 10 is completely safe as all line voltage is surrounded by insulation to shield it from the user.

The circuit 15 is configured for either 110 VAC or 220 VAC operation. For 110 VAC operation, transformer T1, terminal E4 is jumpered to E5 and E6 is jumpered to E7 to place the two primary windings in parallel. For 220 VAC operation terminal E5 is jumpered to E6 to place the primary windings in series. Jumpers JP1 and JP2 are installed for the selected 110 VAC or 220 VAC to set the scale factor for the analog-digital converter as described hereinbelow. The circuit 15 will operate with either 50 Hz or 60 Hz.

Power Supply

The controller power supply circuit 77, provides low DC voltage to the transformer circuit by rectifying the output of the secondary of transformer T1 through a diode bridge D2, D9, D11, and D10, filtered by capacitors C1 and C2 to remove the AC ripple. This produces a bipolar supply of positive and negative 12 VDC for the analog-digital circuitry. The positive 12 VDC is reduced to positive 5 VDC by a voltage regulator U2 to power digital logic circuitry.

Zero Crossing Detector

There are several methods of detecting zero crossings of sinusoidal wave forms. The following described zero crossing detector is preferred.

The zero crossing detector 73 provides a synchronization signal for the microprocessor U3. This detector signals the microprocessor of the beginning of each half cycle of the input AC wave form. It is connected to the unrectified portion of the low voltage AC wave form at the secondary of transformer T1. This voltage is fed through resistor R5 to the base of transistor Q3, having its collector connected with the microprocessor. This circuit acts as a zero crossing voltage comparator means. When the wave form is positive, transistor Q3 conducts causing a voltage drop across resistor R10, thereby producing a low voltage to pin 9 of the microprocessor U3 through conductor 76. This zero crossing signal is referred to as "60 Hz" zero crossing in subsequent paragraphs. However it may be the results of either 50 or 60 Hz line frequency. When the wave form is negative, transistor Q3 stops conducting and presents a high to pin 9 of the microprocessor through the conductor 76. Resistor R5 limits the current to the base of the transistor Q3 while diode D3 clamps the base voltage at a safe level during the negative half cycle.

The zero crossing detection circuitry is not precise due to the base-emitter drop of transistor Q3. The threshold occurs at about 0.7 volts instead of at zero, as desired, resulting in the duty cycle of the output signal to be slightly more than 50%. To compensate for this, the microprocessor adds a time delay to trigger the triac Q1 time on every other half cycle.

During the cooking process, the current readings for each half cycle are saved. At the completion of a full cycle, the positive and negative values are compared. If the negative half cycle is greater than the positive, the delay is increased and less power will be delivered on the next positive half cycle. If negative is less, the delay is decreased and more power is delivered to the next negative half cycle. This assures that the cooking power delivery is equal on both half cycles.

When direct current (non-alternating) is passed through meat, the blood migrates toward one electrode causing that side to turn red while the other side turns a greenish color. Equal half cycle power delivery is important to avoid this effect. The flavor and odor also are not appealing when this occurs. With AC power there is no net migration if the current wave form is balanced. Hence, great care is taken to assure that the zero crossing detection is properly compensated.

Microprocessor

The microprocessor U3 controls all aspects of operation of the cooker 12 from the user interface (switches SW1, SW2, SW3 and LEDs D4, D5 and D1) to controlling and monitoring the cooking process as follows: allows the user to turn the cooker on and off but the circuit is always powered as long as the unit 14 is plugged in and when the "power" switch SW1 is pressed, the mode LED lights indicating the unit is ready and when in the "off" mode, all switches other than "power" SW1 are inactive; sets the cooker mode, the default mode being hamburger (ground beef) but may be set to chicken mode by pressing the select toggle switch SW2 or to toggle between hamburger and chicken modes; sets the proper indicator lights (LED's) to indicate cooker mode; monitors the current and stops cooking at the optimum point, approximately 87% of peak current for hamburger and approximately 37% of peak current for chicken; computes a compensation factor to balance the time of the current positive and negative half cycles; implements a digital filter to smooth the current measurement in chicken mode to prevent premature shutoff due to "pops" as a result of vaporized moisture in the meat; sends trigger pulses to the triac Q1 to switch on current and thereby cook the food 75; delays the time into half cycle to send the triac trigger pulse to thereby limit the current; provides a timed safety shutoff, in the event the start switch SW3 is closed and no food is in the cooker 12; provides an audible signal when cooking is done; and, resets the circuitry for the next cooking cycle.

The microprocessor U3 (FIG. 5A) is a complete computer contained in an integrated circuit containing the program ROM, RAM, CPU, I/O ports, clock and reset circuitry. The oscillator may be formed by a RC combination of resistor R8 and capacitor C5 or by a ceramic resonator X1. The oscillator frequency of resistor R8 and capacitor C5 is about 1 MHz but will vary from device to device, as a result of changes in ambient temperature and component tolerance differences. Resonator X1 has built-in load capacitors and has a resonate frequency of 4 MHz. The ceramic resonator X1 is preferred for its greater accuracy.

The oscillator frequency affects the accuracy of the presently described analog-digital converter since the magnitude of the cooking current is determined by counting the number of clock cycles required to de-integrate. The cooking complete shutoff point is a relative measurement based on the average value, so absolute accuracy is not important. However, absolute accuracy is important in determining the point at which the triac trigger pulses should be retarded into the half cycle to control the maximum current. With an inaccurate oscillator such as the RC type, this current limit point cannot be well controlled. The current controlling function is described in detail below.

Ports RA of microprocessor U3 are configured as outputs to drive the triac gate element U1 and the three LEDs D4, D5 and D1. Ports RB has pins 6, 7, 8, 9 and 10 configured as inputs for the three switches, SW1, SW2 and SW3, the zero crossing signal conductor 76 and the analog-digital converter 79, respectively. The remaining pins 11, 12 and 13 are outputs which control the analog-digital converter and operate the beeper BP.

Current Monitor

The monitor 78 allows the microprocessor to determine when cooking is complete. As previously explained on some current sense transformers, the neutral wire of the AC line is looped through the center of the current sensing transformer T2 before connecting to terminal E3. This makes a single turn primary winding. On other transformers, the primary is part of the device like a conventional transformer, and the neutral wire connects directly to terminal E3. The current is through transformer T2 to the food 75 as shown on the schematic. The secondary of the transformer T2 produces a voltage across resistors R15 and R16 which is a reflection of the current through the food being cooked. U4A and U4B are precision half wave rectifier circuits. Since diodes D6 and D7 are inside the feedback loops, their forward drops are compensated for by the op-amps. The outputs, which are fed to JP1 and JP2, are accurate representations of each half cycle current. The signals are summed at pin 13 of integrator U4D and together form a full-wave rectification of the AC wave form from the secondary of transformer T2.

The two jumpers JP1 and JP2 select the appropriate integrator gain for either 110 or 220 VAC operation. For 110 VAC, the jumpers are set to the upper positions, as viewed in FIG. 5B, labeled "110" which selects appropriate resistors R17 and R18. For 220 VAC operation the current must be set to a lower position labeled "220" to prevent overheating the triac Q1. This is accomplished by setting the jumpers to connect the appropriate resistors R22 and R23 and increase the current to the integrator U4D, so the microprocessor U3 sets the current control at a lower threshold value.

Analog-Digital (A-D) Converter

There are several methods of converting analog signals to digital. For this particular application, the preferred embodiment consists of a dual slope analog-digital converter. This method uses the microprocessor U3 to time the duration of discharge of a capacitor.

The analog-digital converter 79 converts the analog input of the current passing through the food 75 into digital values compatible with the microprocessor U3. It accepts the output of the current monitor 78 through resistors R17 and R18 (or R22 and R23). The conversion from analog to digital is achieved by integrator U4D and comparator U4C forming a dual slope analog-digital converter. Capacitor C8 and U4D form an integrator means which is reset to zero by transistor Q4. Transistor Q2 and resistor R4 provide a de-integrate signal referenced to VCC (+5V). Comparator U4C and transistor Q6 form a zero crossing comparator and detect when the integrator U4D and capacitive means C8 reaches zero. The output of transistor Q6 is a TTL signal which is fed to the microprocessor U3, pin 10.

When a 60 Hz zero crossing is detected by microprocessor U3, the triac Q1 triggered time is delayed by 3.3 msec.

During this time, the analog-digital converter 79 is finishing its previous cycle. At the 3.3 msec point into the half cycle, the integrator is reset. This is done by a high-going pulse output by microprocessor U3 on pin 11 momentarily turning on transistor Q4 which bleeds off any charge stored by capacitor C8. The triac Q1 is then triggered and current through the food increases. This current is sensed by transformer T2, rectified by rectifier circuits U4A and U4B and integrated by U4D. The integration time lasts until the end of the half cycle which is 5 msec. (At 60 Hz, the period is 16.67 msec. One half cycle is 8.33 msec and the triac trigger delay is 3.3 msec.)

During the 5 msec integration period, the output of integrator U4C will ramp in a positive direction. At the end of this time, the voltage at U4C pin 10 will be proportional to the current during the half cycle. This may be up to several volts, depending on the sensed current. U4C acts like a voltage comparator with a zero volt reference. Since its pin 10 is above ground, U4C output pin 8 will be at a large positive voltage. This output is converted to a logic level by transistor Q6 which in this case produces a logic low on signal "ADC" (U3 pin 10).

The integration period ends at the next 60 Hz zero crossing. At this time the triac automatically turns off as the current drops to zero. De-integrate transistor Q2, is biased on by a positive voltage from microprocessor U3 pin 12 feeding a positive current to integrator U4D, pin 13. This is a precise current formed by the regulated 5 volts and resistor R4. Since it is positive, the integrator output U4D will ramp in the negative direction. The duration of the negative ramp is determined by the time of linear discharge to zero of the capacitor C8. When the integrator output reaches zero, U4C will switch to a negative output. This causes transistor Q6 to turn off and the "ADC" signal is pulled high by resistor R9. The microprocessor U3 measures the time by counting clock cycles between the "60 Hz" zero crossing point and the point when the "ADC" microprocessor pin 10 input goes high indicating the integrator has reached zero volts. The input current is thus proportional to the time duration of the de-integrate (discharge) cycle.

Small input signals will de-integrate faster than large signals. Time is added at the end of the de-integrated phase so that the triac is always triggered at precisely 3.3 msec. More time is added for small signals, less time for large signals.

Power On

When the controller unit 14 is connected with the AC source, the power supply is active and the microprocessor U3 generates an internal power on reset signal. This sets all registers to a known condition, all LED's and the triac gate element U1 are turned off.

To the user, the cooker appears to be off, but the microprocessor is actually running waiting for a switch to be pressed. The unit is entirely safe even when in a "power on" condition. There is no exposed voltage with which the user may come in contact. The cooker 12 will not operate until the lid 18 is closed and the power switch SW1 is closed, the start switch SW3 has been pushed and food is between the respective electrodes 30, 42 and 32.

Switch Polling Loop

After initialization and half cycle equalization, the program goes into a loop polling the switches. At this point, the only switch which has any affect is the "power" switch SW1. The other switches are ignored. When the power switch is closed, a short beep is sounded by a beeper BP (Fig. 5B) and the "hamburger" LED D4 turns on. The cooker always defaults to "hamburger" cooking mode at turn-on. Closing the "select" switch SW2 will cause the "hamburger" LED D4 to turn off and the "chicken" LED D5 to turn on. The select switch alternates between these two modes. Each time a switch is pressed a short click or beep is sounded by the beeper BP.

Cooking Cycle

The cooking cycle is initiated by pressing the "start" switch SW3. The "cooking" LED D1 will turn on and will remain on while cooking. During this time, the triac will be triggered at a point 3.3 msec into each 60 Hz half cycle. The current is measured by integrating for 5 msec and measuring the time to de-integrate back to zero. On each half cycle, the current is compared against the previously measured peak. If the new value is greater, it is saved as the new peak. If it is lower, the cooking complete condition is tested. When the cooking complete condition is reached, the triac shuts off and the beeper sounds a series of beeps. The cooking LED D1 turns off and the cooker 12 is ready for another cooking cycle or may be shut off.

Cooking Complete

The cooking complete condition is tested by comparing the measured current to the peak value. When hamburger LED D4 is selected, the desired current shutoff point is about 90% of maximum. Since the microprocessor U3 has limited math calculating capabilities, to simplify the program, the fraction ⅞ is used which is actually 87.5%. By keeping the numerator small and making the denominator a power of $2^3$, the complexity of the calculation algorithm may be greatly reduced. In this case, the peak value is multiplied by 7 by adding 7 times. Dividing by 8 is accomplished by shifting the binary number 3 bits to the right. The resulting number is close to the desired 90% cutoff threshold. When chicken LED D5 is selected, the fraction is 5/16. This results in a cooking complete condition of 31.3% of the peak value.

Digital Filter

In chicken mode, a digital filter is implemented in firmware to smooth the response of the current measurement. This is necessary for the reason, as mentioned hereinabove, chicken tends to pop when in the cooker and these pops momentarily interrupt the current. Without the filter, the cooking done condition may be triggered prematurely and the cooker will turn off before the proper time.

The filter, not shown, is a single pole low-pass exponential type with a cut-off frequency of about 1.25 Hz. To implement the digital filter, a register is assigned and initialized to zero.

In using the filter output register to test chicken for the done condition, if a momentary current dropout occurs, the filtered response will be only minimally affected. Large fluctuations in the current measurement are smoothed out and proper cooking is achieved.

Current Control

The cooker is intended to operate with standard residential AC power: 110 VAC, 50 Hz or 60 Hz, 15 amp service. When the triac Q1 is triggered, only the resistance of the hamburgers 75 limit the current. To prevent the current from rising above 15 amps a phase control technique is employed. To limit the current, the point in the half cycle at which the triac is triggered is delayed. This shortens the conduction time of the triac and reduces the average current through the food being cooked.

Initially, when the cooking cycle begins, the triac is triggered at 3.3 msec into the half cycle. Each current measurement is checked for current limit. If the value is greater than 15 amps, 10 microseconds are added to the trigger delay time. If the next current measurement is also greater than 15 amps, another 10 microseconds is added and so on, until the current is below the maximum. The delay is never shortened until a new cooking cycle which starts off again at 3.3 msec. Testing has shown that although several cycles may occur with peak currents slightly over 15 amps, the average current is kept to a level sufficiently low to prevent blowing a fuse.

The cooking done condition is a relative measurement since it is dependent on a value of the peak current. The current limit is an absolute measurement intended to limit at about 15 amps.

When the circuit is used with 220 VAC, the current limit is set to approximately 8 amps in order to protect the triac from overheating. Overheating becomes a problem with the increased supply voltage because although the average current remains constant, the peak current is significantly higher. By doubling the voltage and halving the current, the cooking power and therefore the cooking time remains the same.

Safety Shutoff

While cooking, the elapsed time is measured by counting the number of full 60 Hz cycles. If the cooking complete condition is not reached in 3 minutes, the triac and cooking LED D1 will turn off, and a single beep will sound from the beeper BP indicating an error. The single beep is a sound distinctive from the normal series of beeps cooking complete indication.

If the cooker is started without two hamburgers 75 in place there will be no current measured and the unit will shut off as described above in 3 minutes.

After the cooking process is started, pressing any switch will stop the cooking process, and a single beep will sound.

Firmware

As mentioned hereinabove the microprocessor U3 is programmed with firmware, permanently stored in its ROM (read-only memory). The firmware is written in assembly language and is then input to an assembler program which produces an object file. This file is used to program the microprocessor.

The terms circuit, circuitry, controller circuitry as used herein are intended to include hardware and firmware.

Obviously the invention is susceptible to changes or alterations without defeating its practicability. Therefore, we do not wish to be confined to the preferred embodiments shown in the drawings and described herein.

We claim:

1. An apparatus for passing current through food for a cooking operation, the current having a magnitude that varies sinusoidally over each of a succession of cycles, each cycle having a positive portion, a negative portion and a zero crossing point therebetween, the apparatus comprising:

conductive plates between which the food is contactingly disposed;

a switch selectively applying the current to the conductive plates, the switch allowing the current to pass through the food;

zero crossing detection circuitry detecting the zero crossing points in each cycle of the current;

current detection circuitry including an analog-digital converter determining the current magnitude of each half cycle of the current; and, current controller circuitry operably connected to the zero crossing detection circuitry, the current detection circuitry and the switch, the controller circuitry enabling the switch to apply the current to the conductive plates in response to the half cycle current values determined by the analog-digital converter which are proportional to the values of current through the food being cooked, the values being a function of the cooked condition of the food.

2. The apparatus of claim 1 in which the current controller circuitry compares the output of the analog-digital converter with a predetermined value and delays enabling the switch to apply current to the conductive plates if the predetermined value is exceeded.

3. The apparatus of claim 1, wherein the current controller circuitry further detects a peak amount of current applied to the conductive plates and halts the cooking operation at such time that the amount of current applied to the conductive plates subsequently decreases to a predetermined cooking operation completion value, the completion value comprising a percentage of the peak amount of current.

4. The apparatus of claim 3 in which the completion value is about 87%.

5. The apparatus of claim 3 in which the completion value is about 37%.

6. The apparatus of claim 3 in which the current selecting switch is a triac having a gate control element.

7. The apparatus of claim 1 in which the current controller circuitry is a microprocessor.

8. The apparatus of claim 7 in which the zero crossing detector circuitry further detects the beginning and the ending of each half cycle of unrectified AC wave form current from a power transformer and signals these data to the microprocessor.

9. The apparatus of claim 8 in which the microprocessor compares the average current value of successive half cycle, and if unbalanced, equalizes the duration of output of each cycle to said switch.

10. The apparatus of claim 7 in which the microprocessor compares the current value with a predetermined value and if greater than the predetermined value, delays enabling the switch means for each half cycle to apply current to the conductive plates by a preset value for controlling and limiting the cooking current at a predetermined value.

11. The apparatus of claim 3 further comprising a food type selection switch, the food type selection switch enabling a user to select among a plurality of types of food that can be cooked, wherein a set of completion values are predetermined in relation to each of the types of food that can be cooked and the controller circuitry utilizes the completion value associated with the setting of the food type selection switch.

12. The apparatus of claim 11, wherein the types of food that can be cooked include chicken.

13. The apparatus of claim 12, wherein the current controller circuitry further employs filtering to filter out spurious amounts of current associated with the cooking of chicken.

14. The apparatus of claim 1, wherein the zero crossing detection circuitry, the current detection circuitry and the current controller circuitry are housed in a base unit and wherein the electrodes are housed in a separate, removable unit to facilitate cleaning of the removable unit and electrodes by way of water immersion.

15. A method for cooking food through the application of alternating current to the food, characterized by:

disposing the food between at least two electrodes;

initially applying alternating current to the electrodes so that the alternating current passes through the food;

detecting a zero crossing point between positive and negative portions of each cycle of alternating current;

detecting the current magnitude of each half cycle of the current; and, establishing time values proportional to the current magnitude of each half cycle of current applied to the food being cooked.

16. The method of claim 15 and further including:

comparing the detected current values and applying current to the conductive plates when the succeeding half cycle current value is greater than the former.

17. The method of claim 15 and further including:

detecting the peak and decline of current applied to the food; and, halting the cooking operation at a predetermined percent of the current peak.

18. The method of claim 15 and further including:

detecting the current peak value;

storing the current peak value; and, comparing lower current values with said stored value.

19. The method of claim 18 including:

halting the cooking operation at about 87% of the stored peak value.

20. The method of claim 18 including;

halting the cooking operation at about 37% of the stored peak value.

21. An electrical resistance cooker, comprising;

base means supporting a pair of conductive plates;

an electrical terminal on each plate of said pair of plates;

a lid hingedly connected with said base for pivoting movement toward and away from said base means, said lid having a recess medially its ends;

a third conductive plate removably supported by said lid in vertically spaced relation with respect to said pair of plates;

a controller unit housing separably nested by said lid recess;

electronic circuit controller means contained by said housing for connecting a source of AC with said plate terminals for cooking food interposed between said plates, said circuit controller-comprising:

a controllable switch for selectively controlling the passage of the current through the electrodes;

zero crossing detection circuitry detecting a zero crossing point in each cycle of the alternating current;

current detection circuitry including analog-digital converter means for determining the values of the half cycles of the current; and, controller circuitry, responsive to the zero crossing detection circuitry, for controlling the operation of the switch to apply current to the food, the controller circuitry comprising a microprocessor programmed to:

determine values of the current magnitude of each half cycle of current applied to the food being cooked for controlling and limiting the cooking current at a predetermined value.

22. The cooker of claim 21 and further including: comparing succeeding half cycles current values with the immediately preceding half cycle current value.

23. The cooker of claim 21, wherein the controller circuitry further detects a peak amount of current applied to the food and halts the cooking operation at such time that the amount of current applied to the conductive plates subsequently decreases to a predetermined cooking operation completion value, the completion value comprising a percentage of the peak amount of current.

24. The cooker of claim 23 in which the completion value is about 87%.

25. The cooker of claim 23 in which the completion value is about 37%.

* * * * *